July 28, 1970

I. TRACHTENBERG 3,522,102

METHOD OF PRODUCING ELECTRICITY IN FUEL CELL BY SEQUENTIALLY
INCREASING AND DECREASING TEMPERATURE

Original Filed July 7, 1965

INVENTOR
ISAAC TRACHTENBERG

ATTORNEY

United States Patent Office 3,522,102
Patented July 28, 1970

3,522,102
METHOD OF PRODUCING ELECTRICITY IN FUEL CELL BY SEQUENTIALLY INCREASING AND DECREASING TEMPERATURE
Isaac Trachtenberg, Dallas, Tex., assignor to Texas Instruments Incorporated, Dallas, Tex., a corporation of Delaware
Continuation of application Ser. No. 470,151, July 7, 1965. This application Jan. 15, 1969, Ser. No. 793,238
Int. Cl. H01m 27/20
U.S. Cl. 136—86          15 Claims

ABSTRACT OF THE DISCLOSURE

Disclosed is a method of improving fuel cell performance, including the steps of lowering the cell temperature to a value such that the internal cell resistance begins to sharply increase, maintaining the cell at that temperature for a period of time, and raising the temperature to the normal operating value.

---

This application is a continuation of copending application Ser. No. 470,151, filed July 7, 1965, now abandoned.

The present invention relates to a method for improving the performance of a fuel cell.

Fuel cell performance commonly deteriorates after a period of operation. The object of the present invention is to restore or improve such performance characteristics.

An additional object is to provide a method of cell operation which provides for periodic restoration of cell performance and which may be practiced, if desired, without taking the cell out of service.

In accordance with the present invention, the electrolyte of a fuel cell of the molten carbonate type is cooled from a normal operating temperature which is substantially in excess of the solidification temperature of the electrolyte to a lower temperature which is materially lower than the normal operating temperature. The lower temperature is of a level somewhat in excess of the solidification temperature of the electrolyte, and preferably corresponds to a temperature value at which the rate of change of the internal resistance of the cell with respect to temperature increases sharply.

For a more complete understanding of the present invention and for further objects and advantages thereof, reference may now be had to the following description taken in conjunction with the appended claims and accompanying drawings in which:

The present invention is not concerned with or limited to any specific fuel cell structure. Nevertheless, the structure illustrated in FIGS. 1–4 is described hereinafter as exemplary of a molten carbonate fuel cell system which works well in connection with the practice of the present invention. Additional details regarding the general type structure shown in FIGS. 1–4 are included in U.S. patent application, Ser. No. 336,515 with James K. Truitt as inventor, entitled "Fuel Cell Batteries" filed Jan. 8, 1964, and assigned to the same assignee as the present application.

Figure 1:
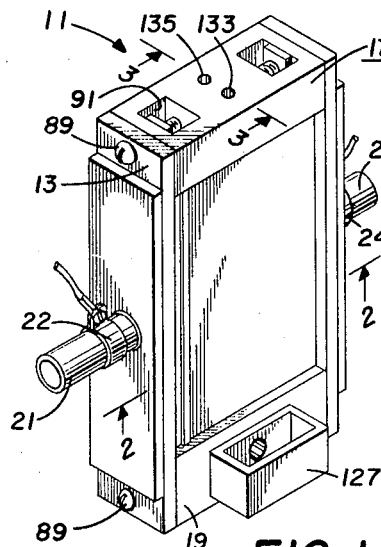
FIG. 1 is a perspective view of a fuel cell unit to which practice of the present invention may be applied.

Considering the structure of fuel cell unit 11, visible in FIG. 1, this boxlike unit has as one end the metallic conducting fuel inlet enclosure 13, and as its opposite end the metallic conducting fuel outlet enclosure 15 which is the same in external appearance as enclosure 13. The top of the boxlike unit is provided by the upper insulating cell support 17, and the bottom by the lower insulating cell support 19. Both of these cell supports are of a good dielectric material such as alumina, lava, or other insulating materials having considerable structural strength.

It is thus seen that the opposite metallic conducting enclosures 13 and 15 and the opposite upper and lower insulating cell supports 17 and 19 define a rectangular structural frame having parallel-spaced metallic conducting members separated and interconnected by spaced upper and lower parallel nonconductors.

Further referring to FIG. 1, a fuel inlet tube 21 extends outwardly from the enclosure 13. To it is securely engaged the annular electrical terminal 22. A fuel outlet tube 23 extends outwardly from the enclosure 15. It has securely engaged to it the electric outlet terminal 24, which is similar in configuration to outlet terminal 22. Electric conductive wires lead from each of the outlet terminals 22 and 24.

Figure 2:
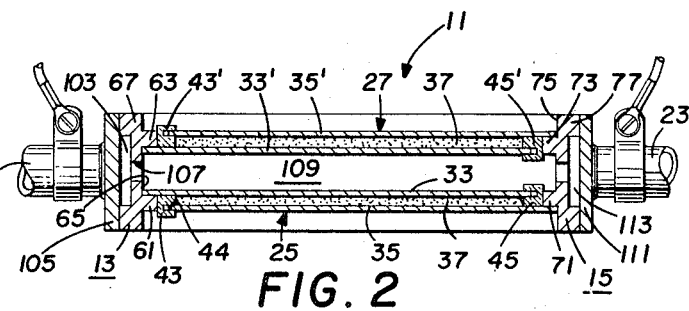
FIG. 2 is a sectional plan view taken along 2—2 of FIG. 1.
Figure 3:
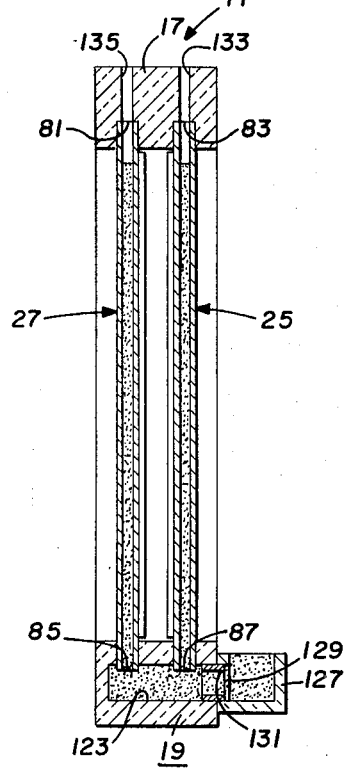
FIG. 3 is a sectional end view taken along 3—3 of FIG. 1.

The details of the structure carried by the rectangular frame work of the enclosures and the insulated cell supports are better understood by referring to FIGS. 2 and 3, which are cross-sectional views of the unit 11 taken at 2—2 and 3—3, respectively, of FIG. 1. A structure defining two fuel cells 25 and 27 (see FIG. 2) is contained within the framework of unit 11. Fuel cells 25 and 27 are generally parallel and spaced apart to effectively provide opposite sides to the boxlike structure of unit 11.

Fuel cell 25 has an inner electrode 33 and an outer electrode 35. These electrodes are rectangular, porous, platelike members; however, metallic screens and various other suitable electrode structures may be substituted, if desired. The electrodes 33a nd 35 are of an electrically conducting material such as silver, nickel, or iron, and are disposed in vertical parallel planes with a space between them occupied by an electrolyte. The electrolyte may be a liquid, a free liquid or may be carried by a rigid dielectric material having a multiplicity of pores, for example, a sintered porous plate of magnesium oxide. If such rigid porous matrix is used, the electrodes 33 and 35 are preferably joined to opposite faces of this matrix by a flame spray technique, a process known in the art.

Unit 11, however, preferably does not utilize either a free electrolyte or one within a rigid structural matrix. Rather, its preferred electrolyte system consists of a liquid electrolyte supported by the capillary action of a multiplicity of loose, finely powdered, porous particles. In accordance with this embodiment, magnesium oxide powder of small grain size and high porosity is dispersed between the electrodes 33 and 35. Carried between these electrodes by the particles of magnesium oxide is the electrolyte, which in this preferred embodiment is a euticitic mixture of sodium and lithium carbonate for example, the electrolyte may consist of 50% molar sodium carbonate and 50% molar lithium carbonate. This system of finely divided porous magnesium oxide particles and electrolyte is hereinafter referred to as the electrolyte slurry. It should be borne in mind that this invention should in no sense be construed as limited to this specific electrolyte system, since a variety of others may be used.

The electrolyte slurry is indicated by the reference character 37 throughout its appearance in unit 11, including within each of the cells 25 and 27.

Spacing between and support for electrodes 33 and 35 is provided, in part, by the insulating grooved spacer 43.

This member is of a good dielectric material having considerable structural strength. Lava and alumina are examples of suitable materials. Insulating grooved spacer 43 is a vertical member of generally rectangular cross section, the groove 44 of which receives the end of electrode 35. The width of this groove is such that good lateral support is provided to the received portion of electrode 35, sufficient clearance being present to permit only a tight, sliding engagement of the received portion of the electrode with respect to the groove. The groove has a substantial depth clearance with respect to the extremity of the received portion of the electrode. This feature is of assistance in permitting the differential expansions to occur, which will be encountered with temperature changes.

Insulating grooved spacer 45, also vertically oriented and has the same configuration as insulating grooved spaced 43 but is oppositely oriented so that its grooved portion receives the end of electrode 33 opposite to the end of electrode 35 received by insulating grooved spacer 43. With the insulating grooved spacers 43 and 45 so oriented, it will be observed that congruent sides of each spacer lie against the side portions of the electrode received in the groove of the other spacer to space the electrodes 33 and 35 apart in generally parallel fashion.

Figure 4:
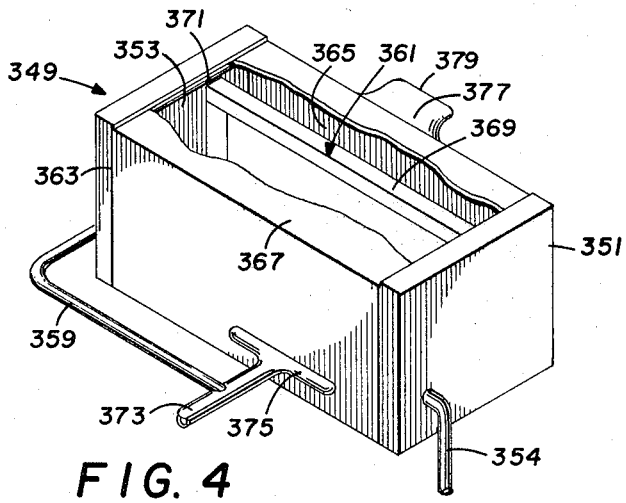
FIG. 4 is a perspective view, partially cut-away, illustrating a battery unit utilizing a fuel cell unit of the general nature of that illustrated in FIGS. 1–3, and suitable for incorporation of a plurality of such units.

As will readily be appreciated from FIGS. 3 and 4, the configuration of fuel cell 27 is exactly the same in all respects to the configuration of fuel cell 25 except that the latter is disposed as the mirror image of the former. In view of the analogy of fuel cell 27 to fuel cell 25, like parts for cell 27 are designated by those same numerals employed in connection with cell 25 except that those numerals for fuel cell 27 are primed.

The fuel cells 25 and 27 are supported between the enclosures 13 and 15. Note that the extending portions of electrodes 33 and 33′ are welded to the opposite inner faces of spaced vertical bus parts 61 and 63. These spaced vertical bus parts are rectangular projections which extend from the vertical face 65 of enclosure body 67. The bus parts are so dimensioned that the extending ends of electrodes 33 and 33′ are substantially flush with vertical face 65, while the insulating grooved spacers 43 and 43′ on the ends of electrodes 35 and 35′ bear against the outer faces of bus parts 61 and 63, respectively.

In like manner, enclosure 15 is welded to the extending end portions of electrodes 35 and 35′ by means of spaced vertical bus parts 71 and 73, extending from face 75 of generally rectangular enclosure body 77.

Referring to FIG. 3, the upper insulating cell support 17 is provided with channels 81 and 83, which are parallel and run the length of insulating cell support 17 from end to end. The channels 81 and 83 receive and carry the upper edge portions of the electrodes of cells 25 and 27. They are just enough wider than the distance across the electrodes of each cell to provide a tight sliding fit of each electrode therein. The channels 81 and 83 are transversely spaced apart to match the transverse spacing between the cells 25 and 27.

The lower insulated cell support 19 has the same general shape as the upper one, and on its upper frame, i.e., the one adjoining the lower portion of the cells 25 and 27, a pair of channels 85 and 87 are formed. These channels have the same configuration and spacing as the channels 81 and 83 in the upper insulated cell support 17.

The upper portions of cells 25 and 27 are supported throughout their length within the channels 83 and 81, respectively. In similar manner, the lower portions of the cells 25 and 27 are supported within channels 87 and 85, respectively. The bus parts 61 and 63 extending from enclosure 13 and the bus parts 71 and 73 extending from enclosure 15 have the same height as the electrodes. Accordingly, each bus part rides in a respective channel along with the electrode assembly to which it is welded. The upper and lower insulated cell supports 17 and 19 are held in assembled position in respect to the enclosure by suitable means, for example, bolts 89. As is seen in FIG. 1, provision is made in the exposed face of the insulated cell support 17 to receive the end of a bolt 89 and permit its engagement with a nut. This provision consists of a recess 91 in member 17. Similar provision is made for each bolt 89.

The enclosures 13 has in its body a rectangular fuel cavity 103 (FIG. 2) which extends vertically from the level of the top of the lower insulated cell support 19 to the level of the bottom of the upper insulated cell support 17. End cover 105 of the enclosure 13 is fastened thereto, as by welding. End cover 105 has an aperture through its mid-portion coincident with its intersection with the inner bore of the fuel feed line 21. Thus, communication is provided via fuel inlet 21 into the cavity 103. An elongated slot 107, formed in wall 65 of the enclosure 13, runs substantially the length of the cavity 103 and is oriented to communicate with the fuel corridor 109, which is the space between the facing walls defined by inner electrodes of fuel cells 25 and 27.

The enclosure 15 has an end cover 111 (FIG. 2) comparable to the end cover 105 of enclosure 13. It encloses the rectangular elongated cavity 113 formed within enclosure 15. Wall 75 of the enclosure 15 is slotted to permit communication between the fuel corridor 109 and the enclosure body cavity 113. An aperture leading through cover plate 111 communicates with fuel exhaust tube 23. This permits spent fuel to exit from the enclosure body cavity 113. It is thus seen that passage is provided for fuel gas from its entrance way via inlet tube 21, past the inner faces of the fuel cells while traversing corridor 109, and finally out through the fuel exhaust tube 23.

As is best illustrated in FIG. 3, transverse bore 123 extends from an outer side of lower insulating cell support 19 to a small distance beyond a point lying below the most distant electrode plate. Bore 123 is disposed in the lower insulating cell support 19 below cells 27 and 25 and is vertically disposed so that its transverse path through the insulating support 19 has common volume of intersection with respect to the lowermost portions of the channels 85 and 87. Thus, the extension of the bore above the bottom of the respective channels defines intersections therewith and, accordingly, forms slots in the bottom of the channels with a length dependent upon the extent of the overlap of the intersection. Such slots permit communication between the bore, hereinafter called electrolyte cavity 123, and the compartments between the electrodes in which the electrolyte must reside for the cell to function.

Cup 127 abuts the side of the lower insulating cell support 19 on which the electrolyte cavity 123 opens. Cup 127 has an aperture 129 extending through the side of the cup and communicating with the electrolyte cavity 123. Connection between the cup and electrolyte cavity 123 may be made by a nipple 131, which joins cup 127 to lower insulated cell support 19.

To further explain the electrolyte system, fine magnesium oxide powder is disposed in each of the cavities defined between the electrodes, in the electrolyte cavity 123, and in the cup 127. Electrolyte is provided to the cells by the capillary action of the magnesium oxide which continues until the electrodes have electrolyte disposed therebetween to an elevation determined by the porous characteristics of the magnesium oxide and by the effective level of liquid in the cup. Note that small vertical apertures extend from the channels 81 and 83 all the way through the upper insulated cell support 17. These apertures 133 and 135 permit communication with the upper portion of the cells 25 and 27, respectively. This assures that atmospheric pressure will prevail in the cells and allow capillary action to continue to its fullest extent.

The pore size associated with the magnesium oxide particles can be varied while the rest of the system remains substantially constant. Consider the equation
where $\gamma$ equals surface tension of the liquid; $h$ equals $$\gamma = \tfrac{1}{2} hgdr$$

height of the column of the liquid above the lower liquid level; $g$ equals acceleration due to gravity; $d$ equals density of the liquid; and $r$ equals radius of the capillary pore. By rearrangement of the equation, it can be seen that the capillary pore radius is directly proportional to the surface tension of the liquid and inversely proportional to the height of the column, the gravitational acceleration and the liquid density. Consequently, with proper sizing of magnesium oxide particles, the desired amount of capillarity can be obtained for a given electrolyte. The liquid level in the cup 127 can also be varied somewhat to adjust the elevation of the electrolyte within the cells.

As an example, in a unit 11 where about a seven inch capillary action electrolyte level is desired, magnesium oxide particles having an approximate diameter of 0.005 inch have been satisfactorily used.

The unit 11 must be placed within a suitable environment providing an oxidizer reactant to contact the outer exposed surfaces of its electrodes 35 and 35'. The electrodes 33 and 33' are provided with fuel via the fuel corridor 109. The unit 11 will function with various reactants, but the preferred system is a gas comprising hydrogen as a fuel feed and a mixture comprising oxygen and carbon dioxide as an oxidizer feed. The hydrogen may either be pure or may be mixed along with various other gases such as nitrogen, carbon dioxide, carbon monoxide, light hydrocarbons, water vapor, etc. The oxygen may either be pure or may be supplied as air. This system can effectively use the various carbonates as electrolyte. A preferred electrolyte is the eutectic mixture of sodium carbonate and lithium carbonate. Such a mixture, 50% molar sodium carbonate and 50% molar lithium carbonate, has a melting point of somewhat below 500° C. A preferred operating temperature is in the vicinity of 600° C., for example, about 650° C.

Hydrogen gas, passed in through tube 21, flows through the fuel cell unit via corridor 109. As it passes through corridor 109, it reacts with electrolyte in contact with electrodes 33 and 33'. Spent fuel leaves through tube 23. The reaction occurring at the fuel electrodes (i.e., the anodes) is as follows:

$$H_2 + CO_3^= \rightarrow H_2O + CO_2 + 2e^-$$

Oxygen and carbon dioxide are passed adjacent the exposed surfaces of electrodes 35 and 35'. At these electrodes (the cathodes are sometimes referred to as the "air electrodes") the following reaction takes place:

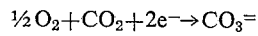

$$\tfrac{1}{2}O_2 + CO_2 + 2e^- \rightarrow CO_3^=$$

In connection with such operation of unit 11, it will be appreciated that a supply of oxygen and carbon dioxide must be provided for the air electrodes. For test purposes, placing the unit within an oven which is provided with such a gaseous supply of oxygen and carbon dioxide (air and carbon dioxide will suffice) thus providing an outer casing to contain the supplied gas. In practice, such operation is seldom practical, and, therefore, a structure is needed to properly receive, direct, and discharge oxygen and carbon dioxide. An example of such structure is illustrated in FIG. 4. Therein, in perspective, is illustrated a boxlike battery structure 349 having opposite ends defined by fuel inlet enclosure 351 and fuel outlet enclosure 353. A fuel cell unit 361 is carried within the structure 349 between the enclosures 351 and 353. The unit 361 is quite similar to the structure of unit 11, previously discussed herein, except that it utilizes the comparatively elongated enclosures 351 and 353 as fuel feed and outlet means. Thus a plurality of fuel cell units such as 361 may be incorporated within the battery structure 349 by using the elongated enclosures 351 and 353 as fuel inlet and outlet enclosures, respectively. It will be apparent that suitable apertures, comparable to slot 107 for enclosure 13 of unit 11 (see FIG. 2), are provided in the fuel inlet and outlet enclosures 351 and 353 to conduct fuel between the cells of fuel cell unit 361. If a plurality of units 361 are incorporated within the structure 349, then a plurality of oppositely disposed apertures or slots will be provided within the enclosures 351 and 353.

The enclosures 351 and 353 are conducting and thus serve as buses. Side 363 is a non-conducting material, such as a ceramic, as is opposite side 365. A bottom, not illustrated, and a top 367 of non-conducting material of a similar nature are also provided. The bottom and top are disposed with a substantial clearance below and above the respective lower and upper insulated cell supports. For example, note the vertical clearance provided between the top extremity of upper insulated cell support 369 and insulated top 367 passing lengthwise along the top of enclosures 353, which is indicated by the vertical distance that top support groove 371 lies above upper insulated cell support 369.

Air input line 373 leads to manifold 375 in the lower portion of wall 363. Note that spent fuel line 359 joins the air input line 373 prior to the manifold 375. Wall 363 has a suitable opening (not illustrated) which receives the gaseous mixture of air and spent fuel from manifold 375. Recall, in this connection, that the bottom of the battery structure 349 is of an insulating material which extends downwardly a substantial distance below the cell supports to provide an air-carbon dioxide receptacle cavity.

If a plurality of fuel cell units 361 are utilized within structure 349, then the units are spaced to provide for oxidizer gas flow between them to allow good contact of the oxidizer gas with the various air electrodes.

The central top portion of side 365 in the large battery configuration of FIG. 4 has an outlet manifold 377 which provides for the outlet of spent air-carbon dioxide from the top portion of the large battery unit to the exhaust line 379.

Unit 361 must be provided with electrolyte for its cells. When a plurality of units 361 are utilized, the electrolyte either may be self-contained in each unit, if desired, as previously described herein, or instead the electrolyte cavities of each unit may be interconnected by a suitable conduit means which terminates in a feeding cup or reservoir external from the unit.

It will thus be apparent that when the battery structure 349 of FIG. 4, is fed air via line 373, that the air, together with the carbon dioxide provided by the spent fuel via line 359, will enter the bottom cavity below the unit 361 and flow up about it to contact the air electrodes to permit the air electrode reaction to occur. If a plurality of units 361 are utilized, then the air from the bottom cavity will flow upwardly between the various units to provide air for each. In either event, the spent gases flow outward through the outlet manifold 377 to exhaust line 379. Moreover, it is apparent that fuel will pass from fuel inlet conduit 354 into the cavity within enclosure 351, thence through the unit 361 to contact the fuel electrodes, and fiinally out through the cavity of the enclosure 353 to join the inlet air via line 359.

The following examples are offered to illustrate a mode of practice of the present invention and are not to be intended as limiting its scope.

EXAMPLE 1

A unit of the type illustrated in connection with FIGS. 1–3, incorporated in a battery structure of the general type illustrated in FIG. 4, was operated for a period of 1419 hours at an operating temperature of about 650° C. The temperature of the unit was materially cooled by increasing the oxidizer gas flow while the unit was disconnected from an external load. The electrolyte temperature was measured by a thermocouple in contact with the electrolyte. After the electrolyte reached a temperature of 520° C., the oxidizer flow rate was adjusted to maintain it at that temperature for several hours. The unit was again connected to an external load and the oxidizer flow rate was adjusted to cause the temperature to increase. In due course, the normal operationg temperature of 650° C. was again achieved.

The time of the cooling cycle, i.e., the time for the temperature to drop from 650° C. to 520° C. was about 4 hours; it then required a heating cycle of approximately 4 additional hours to again achieve an electrolyte temperature of 650° C. After the cooling cycle when the electrolyte temperature reached 520° C., but before the reheating cycle was started, the electrolyte temperature was maintained at 520° C. for approximately 16 hours.

The maximum power output at 1419 hours, prior to temperature cycling, was 24.5 watts/ft.² After the unit temperature was cycled in accordance with the present example, its maximum power output was again measured at 650° C. The value obtained was 33.2 watts/ft.²

EXAMPLE 2

A unit of the general type illustrated in FIGS. 1–3 was operated for a period of 616 hours at 650° C. At the end of that time, the maximum power output was measured to be 16 watts/ft.² The cell was cooled to 480° C. and then reheated to 650° C. After cooling and before reheating, the cell was maintained at 480° C. for about 8 hours. In this particular example, the unit was maintained within an ovenlike enclosure and the temperature was controlled by controlling the quantity and temperature of the oxidizer gas input. Fuel and oxidizer were permitted to flow to the anode and cathode, respectively, throughout the period of temperature cycling. After the cell had been again brought to the initial temperature of 650° C., it was operated at that temperature until a total unit operating time of 642 hours had passed, i.e., an additional 26 hours of operation from the time when unit cycling was commenced. At this time, the maximum power output in the cell was measured to be 40.1 watts/ft.² The unit was continued in normal operation until a lapse of 832 total operational hours had occured. The power output of the unit at that time was measured to be 33.8 watts/ft.²

The unit was once again cooled overnight. The minimum temperature achieved in unit cycling in this second instance was 520° C. After reheating the unit to 650° C., the maximum power output of the unit was found to be 43.4 watts/ft.² at 650° C. after a total passage of 859 operating hours.

EXAMPLE 3

The preceding example was repeated on a fuel cell unit of the same type. After 49 hours of operation, the maximum power output of the unit was 21.4 watts/ft.² The unit was cooled to 520° C. and allowed to remain at that temperature overnight. It was then reheated to 650° C. The maximum power output was found to be substantially increased. For example, after 80 hours of total unit operation, the maximum power output was found to be 67.2 watts/ft.² After a total elapsed period of 194 hours of unit operation, performance had dropped to a maximum power output of 24.3 watts/ft.² at 650° C. At this time, the unit temperature was again cycled by cooling to 520° C., followed by reheating to 650° C. Substantial performance increase resulted: after a total lapse time of 217 hours of unit operation, the maximum power output was found to be 51.7 watts/ft.² By the completion of 312 hours of total lapsed operating time, performance had degenerated to a maximum power output of 17.3 watts/ft.² The cell was then again cycled, this time to a temperature of 485° C., and reheated to 650° C. This procedure improved performance, the maximum power output being measured as 40 watts/ft.² at 650° C., after a total lapse of 339 hours of operation.

It should be noted that it is not necessary that a cell unit be disconnected from external load during the period of its cycling. Thus, it has been found that the cell temperature may be cycled in accordance with the present invention, while cell operation is occurring. In such instance, the cell output is substantially less at the lower temperature; however, a lower output in some installations is quite compatible with continuous cell operation since cell load requirements may vary from a maximum value to a substantially lower minimum value. During the periods that peak performance is required, the cell temperature is maintained at the normal operational values (for example, at about 650° C., with a sodium-lithium carbonate eutectic electrolyte of the type referred to previously herein). Then, during a period of light load when power requirements are modest, the cell can be cycled and still meet the power output requirements.

It is preferred that the cycling time be at least 2 hours in duration. By "cycling time" is meant the time required to lower the temperature, maintain the temperature at the lowered level for a given time, and then restore it to its normal operating value. For best results, the cycling time should be much longer than 2 hours; indeed, the electrolyte should remain at the minimum temperature for several hours, preferably 8 to 16 hours.

Figure 5:
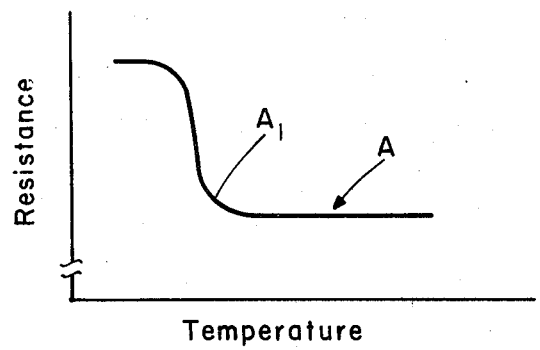
FIG. 5 is a characteristic curve illustrating the relationship between the internal cell resistance and the temperature of a carbonate type fuel cell.

The present invention is applicable to molten carbonate fuel cell systems generally, and is not limited to a sodium-lithium carbonate electrolyte previously referred to herein. For example, a binary potassium-lithium carbonate or a ternary sodium-potassium-lithium carbonate may be utilized. Operational temperatures of the ternary system may vary from those of the sodium-lithium carbonate binary system, an exemplary operational temperature of the former being about 550° C. In cycling such a ternary system type cell, the electrolyte temperature will be lowered to a value somewhat above the solidification temperature of the system, which, for the ternary system referred to, is on the order of about 400° C. in view the variety of specific molten carbonate electrolytes which may be utilized, it will be seen that a specific minimum temperature for cycling cannot be stated. It has been found, however, that the approximate minimum temperature to which the electrolyte should be lowered during cycling corresponds generally to the temperature at which the rate of change of the internal resistance of the cell with respect to electrolyte temperature increases sharply. This is illustrated in FIG. 5 wherein a characteristic curve of internal cell resistance (R) versus temperature (T) of the electrolyte is shown. Specific resistance and temperature scale values are not given since these will vary with various molten carbonate electrolytes, as will the precise shape of the R v. T curve. Referring to the characteristic curve of FIG. 5, which is identified as A, it will be observed that the slope of the curve changes quite rapidly in the region identified as $A_1$. This rapidly changing slope coincides with the change of the state of the electrolyte, which at this temperature range is commencing to pass from a liquid to a solid state. Pursuant to such state changes, the internal resistance of the cell rises rapidly with decreasing electrolyte temperature.

The preferred minimum temperature to be reached in cycling has been found to correspond generally with the temperature existing in the region $A_1$ on the characteristic curve A of FIG. 5. In any event, it is desired to substantially decrease temperature during cycling from a normal operating temperature to a second temperature which is materially lower than the normal operating temperature but somewhat in excess of the solidification temperature of the electrolyte.

It is not known with certainty why the present invention is effective in increasing cell performance, and, accordingly, it is not desired nor intended to limt the present invention by speculation concerning theory. However, it is believed that the cooling cycle causes the electrolyte to contract a slight amount. Such contraction results in the electrolyte moving away from the electrodes, which then become more exposed to the atmosphere of the gaseous reactants adjacent to them. Reaction appears to occur between the adjacent gases and the electrodes to reactivate the electrodes and make them more efficient for cell operation.

In addition, it appears that hydrogen and oxygen dissolve in the electrolyte during operation. At lowered temperatures these gases have increased solubility in the electrolyte. When the temperature is returned to its normal high operating level, such gases apparently may remain in super-saturated quantities within the electrolyte. This appears also to increase performance.

It further seems that the exposure of the cathode to an oxidizing atmosphere, in certain cases, causes the formation of a film on it which increases its tendency to be wetted by the electrolyte. For example, when the cathode comprises silver, a material quantity of silver oxide forms, resulting in an increased tendency of the cathode to be wetted. Analogous results may occur at the anode, when it is exposed to an increased reducing atmosphere. Such exposure causes a reduction of metal oxides from the anode exposing more of the metal itself. Upon reheating, the anode then tends to be wetted less by electrolyte than previously. This appears to contribute to improved performance.

Finally, the temperature cycling process of the present invention establishes a new interface of the electrolyte with respect to the electrode and gaseous reactants, which appears to cause better performance.

The practice of the present invention is illustrated herein with a specific configuration of a fuel cell unit consisting of two fuel cells in parallel. However, the invention is applicable to fuel cell batteries generally, whether of one cell or a multiplicity of cells, or whether the cell arrangement be in series, in parallel, or series-parallel. A series-parallel type cell which is of the general preferred type for practice of the present invention is disclosed in U.S. patent application Ser. No. 336,515, previously referred to herein.

It has been seen that the present invention provides a method for improving performance of a fuel cell which includes the essential step of lowering the temperature of the cell's electrolyte from a normal operating temperature to a substantially lower temperature. Thereafter, the temperature of the electrolyte may be again raised. Such temperature recycling may be repeated periodically to maintain cell performance at a high level.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a method of producing electricity in a fuel cell of the type having an anode, a cathode, and a molten carbonate electrolyte and which is normally operated at a temperature substantially in excess of the solidification temperature of the said molten carbonate electrolyte, the improvement which comprises:
  lowering the temperature of said electrolyte from said normal operating temperature to a second temperature at which the internal resistance of the cell begins to increase sharply, and
  thereafter raising the temperature from said second temperature of said electrolyte back to said normal operating temperature of said cell.

2. The method of claim 1 in which fuel and oxidizer are passed adjacent the anode and cathode, respectively, of said cell while said electrolyte is at the second temperature.

3. The method of claim 2 in which the said electrolyte is carried by a porous inert structure.

4. The method of claim 3 in which said inert structure comprises a multiplicity of porous particles.

5. The method of claim 1 in which the total time lapse between the commencement of lowering of temperature and the completion of the raising of temperature back to normal operating temperature is at least two hours.

6. The method of claim 1 in which said electrolyte consists essentially of sodium-lithium carbonate.

7. The method of operating a fuel cell to produce electricity and obtain good performance therefrom comprising:
  periodically cycling the temperature of the electrolyte of said cell between a normal operating temperature at which electricity is produced and a lower temperature at which the rate of change of the internal resistance of said cell with respect to temperature increases sharply, and maintaining the flow of fuel and oxidizer to the anodes and cathodes, respectively, of said cell during said cycling.

8. The method of claim 7 in which said fuel cell is operating under reduced or no load.

9. The method of claim 8 in which said electrolyte is maintained at the lower temperature for a period of between about eight and sixteen hours duration.

10. In a method of producing electricity in a fuel cell of the type having an anode, a cathode, and a molten carbonate electrolyte, said cell operating with said electrolyte at a normal temperature substantially in excess of the solidification temperature of the molten carbonate electrolyte in said cell, the improvement which comprises:
  (a) lowering the temperature of the molten carbonate electrolyte of said cell from said normal operating value to a decreased value within the range of from about 450° C. to about 550° C.,
  (b) passing fuel and oxidizer through said cell to contact the fuel and oxidizer electrodes while said temperature is at said decreased value, and
  (c) raising the temperature of said cell from said decreased value to said normal operating value.

11. The method of claim 10 in which said electrolyte is carried by porous inert structure.

12. The method of claim 11 in which said inert structure comprises a multiplicity of porous particles.

13. The method of claim 10 in which said electrolyte consists essentially of sodium-lithium carbonate.

14. The method of claim 10 in which the total time lapse between the commencement of the lowering of temperature and the completion of the raising of temperature back to normal operating value is no less than about two hours.

15. The method of claim 14 in which the electrolyte temperature is maintained at the said decreased value for a period ranging between about eight and sixteen hours.

References Cited

UNITED STATES PATENTS

| | | | |
|---|---|---|---|
| 2,980,749 | 4/1961 | Broers | 136—86 |
| 3,068,311 | 12/1962 | Chambers et al. | 136—86 |

ALLEN B. CURTIS, Primary Examiner